Feb. 27, 1940.   H. C. WARREN   2,191,812
STOPPER FASTENER
Filed Aug. 31, 1938
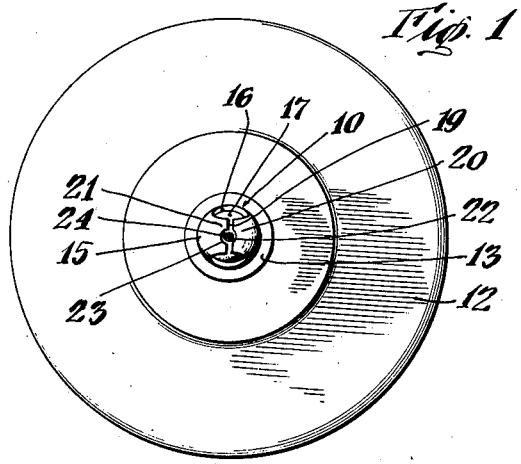
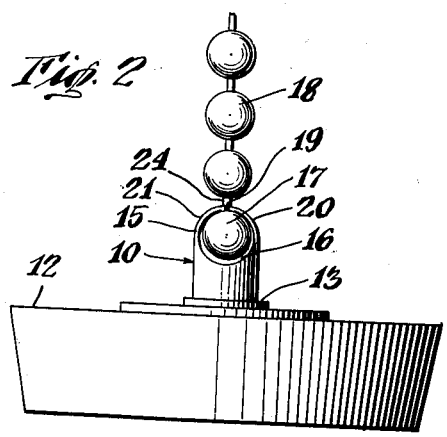
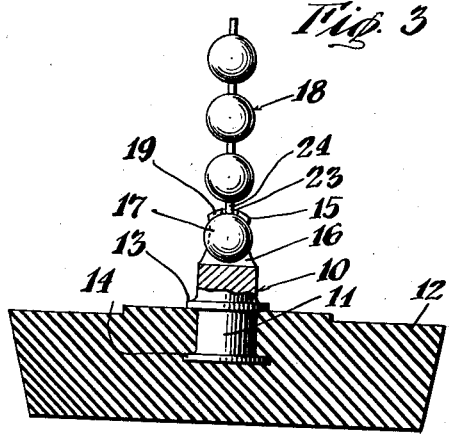
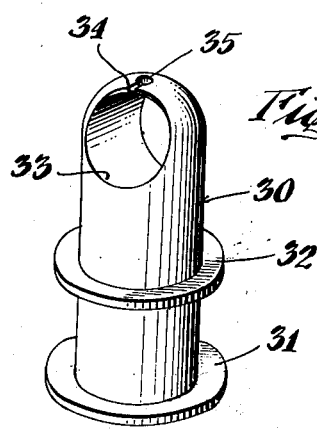
INVENTOR
Harold C. Warren
BY
Hoguet, Neary & Campbell
his ATTORNEYS Patented Feb. 27, 1940

2,191,812

UNITED STATES PATENT OFFICE 2,191,812

STOPPER FASTENER

Harold C. Warren, Stratford, Conn., assignor to Canfield Rubber Company, Bridgeport, Conn., a corporation of Connecticut Application August 31, 1938, Serial No. 227,624

5 Claims. (Cl. 4—295)

This invention relates to fastening devices and relates particularly to devices for coupling bead chains to plumbing fixtures, such as, for example, stoppers for drains and the like.

The most common type of device for coupling bead chains to fixtures consists generally of a capsule-like member within which is received the end bead of a bead chain. A ring passes through apertures in the walls of the capsule and is received in a transverse bore in the end of a plug which is partially embedded in the stopper or other plumbing fixture. This type of coupling device, while permitting ready detachment of the chain from the stopper, is unsightly and unnecessarily complicated, for the reason that three differently shaped and sized parts are required to couple the chain to the stopper.

This invention has as its principal object, the provision of a simplified coupling device by means of which a bead chain can be connected directly to a plumbing fixture.

Another object of the invention is to provide a coupling device which forms a part of a stopper or other plumbing fixture and to which a chain may be detachably connected.

Other objects of the invention will become apparent from the description of typical forms of devices embodying the invention.

Devices of the type embodying the present invention consist generally of a member which is fixed to or embedded in a stopper or other plumbing fixture and which has an end projecting beyond the upper surface of the fixture and provided with means for detachably receiving the end bead of a bead chain. The means for receiving the end bead is a transverse bore of sufficient size to receive the bead and a transverse slot in the end of the coupling member for receiving one of the wire links that connect the beads of the chain. The transverse slot may extend entirely across the end of the coupling member to form spaced jaws or arms between which the link of the bead chain is received, or only partially across the end of the coupling member and may be provided with an enlarged portion of sufficient diameter to loosely receive the link on the chain. The slot may be of sufficient width to allow the link to pass freely therethrough or it may be of such narrow width that the arms must be sprung slightly in order that the link may pass into the slot. The former type of slot may be closed by compressing the ends of the arms toward each other to thereby lock the link firmly in the coupling, while with the latter type, the resiliency of the arms is sufficient to prevent inadvertent removal of the link from between the arms.

The coupling device may be provided with integral flanges which when embedded in for example a rubber stopper, prevents the ready withdrawal of the coupling member therefrom. Alternatively, the coupling member may be formed from a plurality of detachable parts which permit the coupling element to be readily removed from or attached to the stopper.

Devices of the type described generally above are simple, convenient in use, and of greatly improved appearance over the coupling devices heretofore known. The unsightly ring and capsule normally used to connect chains and stoppers are eliminated, and by reason of their elimination, the cost of the entire coupling assembly is materially reduced.

For a better understanding of the present invention, reference may be had to the accompanying drawing, in which:

Figure 1 is a plan view of a stopper with a typical form of coupling device connected thereto;

Figure 2 is a side view of the stopper shown in Figure 1;

Figure 3 is a view partly in vertical section and partly broken of the stopper shown in Figure 1; and Figure 4 is an enlarged perspective view of a modified form of coupling device.

The form of coupling member disclosed in Figures 1 to 3, consists of a plug 10 having a generally cylindrical body 11 which is embedded in a stopper 12. The body 11 of the plug is provided with a pair of spaced flanges 13 and 14 which act to position and fix the plug firmly in the stopper 12. The upper end 15 of the plug 10 may be rounded or of any other desired shape and is provided with a transversely extending cylindrical bore 16 of sufficient size to loosely receive the end bead 17 of the bead chain 18. The end 15 of the plug is provided with a transversely extending slot 19 which communicates with the bore 16, thereby forming curved converging arms or jaws 20 and 21 on the end of the plug 10. The opposed ends of the arms 20 and 21 are provided with notches 22 and 23 within which is received the link 24 on the bead chain.

The slot 19 may be made of sufficient width to allow ready passage of the link 24 therethrough from end to end. When the link is received in the opposed notches 22 and 23, the jaws or arms 20 and 21 may be crimped or squeezed together to substantially close the slot and thereby retain the link 24 within the notches 22 and 23.

If desired, the slot 19 may be made narrower than the thickness of the link 24 so that it is necessary to distort the jaws in order to snap the link into the notches 22 and 23. The natural resiliency of the jaws 20 and 21 causes them to retain the link firmly in the notches.

In the modified form of coupling device shown in Figure 4, the plug 30 is provided with radial flanges 31 and 32 for retaining the plug in the stopper, and similarly to the modification described above, includes a transverse bore 33 for receiving the end bead on the bead chain. The slot 34 for receiving the link on the chain extends only partially across the end of the plug 30 and is provided with an enlarged portion 35 for receiving the link on the chain. With this form of device, the link may be passed into the enlargement 35 and the slot 34 substantially closed by pressing together portions of the plug which are adjacent to the slot 34.

Both of the forms of the invention described above are characterized by extreme simplicity and by improved appearance. The plugs or coupling members may be made of any desired shape to conform to the design of the particular plumbing fixtures with which they are to be used and likewise may be made of many different types of materials. All necessity for additional coupling rings and capsules is eliminated, while at the same time the ease of attachment and disconnection which is so highly desirable in devices of this type is retained.

While the forms of the invention described above have included integral plug members which are adapted to be embedded in a stopper or other plumbing fixture, it will be understood that the plugs may be formed of a plurality of parts, such as for example, interfitting screw members or press-fitted elements.

It will be understood that there can be many variations made in the shape or form of coupling devices embodying the present invention, and that they may be made from various types of material, or combinations of materials, without departing from the invention. Therefore, the forms of the invention described above should be considered as illustrative only and not as limiting the scope of the following claims.

I claim:

1. A fastening device for connecting a chain having beads and connecting links to plumbing fixtures, comprising a coupling member adapted to be fixed in said plumbing fixture with one end disposed outwardly of said fixture and having a transverse bore adjacent said one end for receiving a bead and a slot extending at least partially across said one end for receiving the link adjacent the bead, said slot being of less width than the thickness of said link.

2. The fastening device set forth in claim 1 in which the slot extends entirely across the said one end of the coupling member and has a central enlargement for receiving said link.

3. A fastening device for connecting chains having beads and connecting links to plumbing fixtures comprising a coupling member having a body and means for fixing the member to the fixture, arms projecting from one end of the body and converging toward their outer ends to define a transversely extending bore for receiving a bead, said arms having notches in their ends for receiving a link of said chain, said ends being spaced apart a distance less than the thickness of said link.

4. A fastening device for connecting chains having beads and links to stoppers, comprising a plug adapted to be partially embedded in said stopper with one end projecting therefrom, said one end having a transverse bore for receiving a bead and a transversely extending slot for receiving a link, said slot being of less width than the thickness of said link.

5. A fastening device for connecting bead chains to stoppers comprising a body member adapted to be partially embedded in a stopper, means on the body member for fixing the body member in the stopper, said body member having a transversely extending bore adjacent to one end thereof and a slot extending partially across said one end and communicating with said bore, whereby the end bead of the bead chain may be disposed in said bore and the said one end compressed to prevent detachment of said chain from said body member.

HAROLD C. WARREN.